(12) United States Patent
Son et al.

(10) Patent No.: US 8,878,692 B2
(45) Date of Patent: Nov. 4, 2014

(54) ENERGY MANAGEMENT SYSTEM AND METHOD AND REPEATER FOR ENERGY MANAGEMENT SYSTEM

(75) Inventors: Dong Min Son, Suwon (KR); Jung Hwan Oh, Seoul (KR); Jae Seong Park, Daejeon (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 579 days.

(21) Appl. No.: 13/216,162

(22) Filed: Aug. 23, 2011

(65) Prior Publication Data

US 2012/0056754 A1   Mar. 8, 2012

(30) Foreign Application Priority Data

Sep. 3, 2010 (KR) .................. 10-2010-0086735

(51) Int. Cl.
*G08C 15/06* (2006.01)
*H04L 29/08* (2006.01)
*H04Q 9/00* (2006.01)

(52) U.S. Cl.
CPC ............. *H04L 67/125* (2013.01); *H04Q 9/00* (2013.01); *H04Q 2209/43* (2013.01); *H04Q 2209/84* (2013.01); *H04Q 2209/60* (2013.01); *H04Q 2209/82* (2013.01)
USPC ..................... 340/870.03; 705/412

(58) Field of Classification Search
CPC ....... G01D 4/002; G01D 4/004; G01D 4/006; Y04S 20/32; Y04S 20/40; Y04S 20/42; Y04S 20/322; Y02B 90/241; Y02B 90/242; Y02B 90/245; Y02B 90/246; H04Q 2209/60; H04Q 9/00; G06Q 50/06; G06Q 30/04; G08C 2201/40
USPC ......................................... 340/870; 705/412
See application file for complete search history.

(56) References Cited

U.S. PATENT DOCUMENTS 6,167,389 A * 12/2000 Davis et al. ............... 705/412
6,311,105 B1 * 10/2001 Budike, Jr. ................ 700/291
(Continued)

FOREIGN PATENT DOCUMENTS

CN        1497258     5/2004
CN      101505070     8/2009
(Continued)

OTHER PUBLICATIONS

Korean Intellectual Property Office Application Serial No. 10-2010-0086735, Office Action dated Aug. 25, 2011, 4 pages.

(Continued)

*Primary Examiner* — Mohammad Ghayour
*Assistant Examiner* — Nay Tun
(74) *Attorney, Agent, or Firm* — Lee, Hong, Degerman, Kang & Waimey

(57) ABSTRACT

Disclosed are an energy management system, an energy management method and a repeater for an energy management system. The repeater receives information on an amount of energy consumption of the individual user from the meter, and receives information on an energy pricing system from the central management server. Then, the repeater analyzes and manages the energy consumption rate of the individual user using the received information, and transmits information on the energy consumption rate to the meter or the central management server. The repeater may also analyze various information such as information on an energy consumption propensity of the individual user. The repeater immediately transmits essential information but transmits incidental information only when there is a request of the meter or the central management server. Accordingly, it is possible to reduce communication traffic between the central management server and the plurality of meters.

15 Claims, 7 Drawing Sheets

(56) References Cited

U.S. PATENT DOCUMENTS

| | | | |
|---|---|---|---|
| 6,477,386 B1* | 11/2002 | Giles | 455/517 |
| 7,058,524 B2* | 6/2006 | Hayes et al. | 702/62 |
| 2002/0040355 A1* | 4/2002 | Weiner | 705/412 |
| 2002/0120569 A1* | 8/2002 | Day | 705/40 |
| 2002/0176427 A1* | 11/2002 | Noda et al. | 370/401 |
| 2006/0031180 A1* | 2/2006 | Tamarkin et al. | 705/412 |
| 2006/0106741 A1* | 5/2006 | Janarthanan | 705/412 |
| 2008/0272934 A1* | 11/2008 | Wang et al. | 340/870.11 |
| 2010/0060479 A1* | 3/2010 | Salter | 340/870.4 |
| 2011/0029461 A1* | 2/2011 | Hardin, Jr. | 705/412 |

FOREIGN PATENT DOCUMENTS

| | | |
|---|---|---|
| JP | 10336766 | 12/1998 |
| JP | 2003315134 | 11/2003 |
| JP | 2003331375 | 11/2003 |
| JP | 2004233239 | 8/2004 |
| JP | 2005513900 | 5/2005 |
| JP | 2010049334 | 3/2010 |
| WO | 2005099245 | 10/2005 |

OTHER PUBLICATIONS

Japan Patent Office Application Serial No. 2011-191371, Office Action dated Mar. 5, 2013, 3 pages.

State Intellectual Property Office of the People's Republic of China Application Serial No. 201110264045.6, Office Action dated Sep. 4, 2013, 6 pages.

* cited by examiner (5a)

(5b)

(5c)

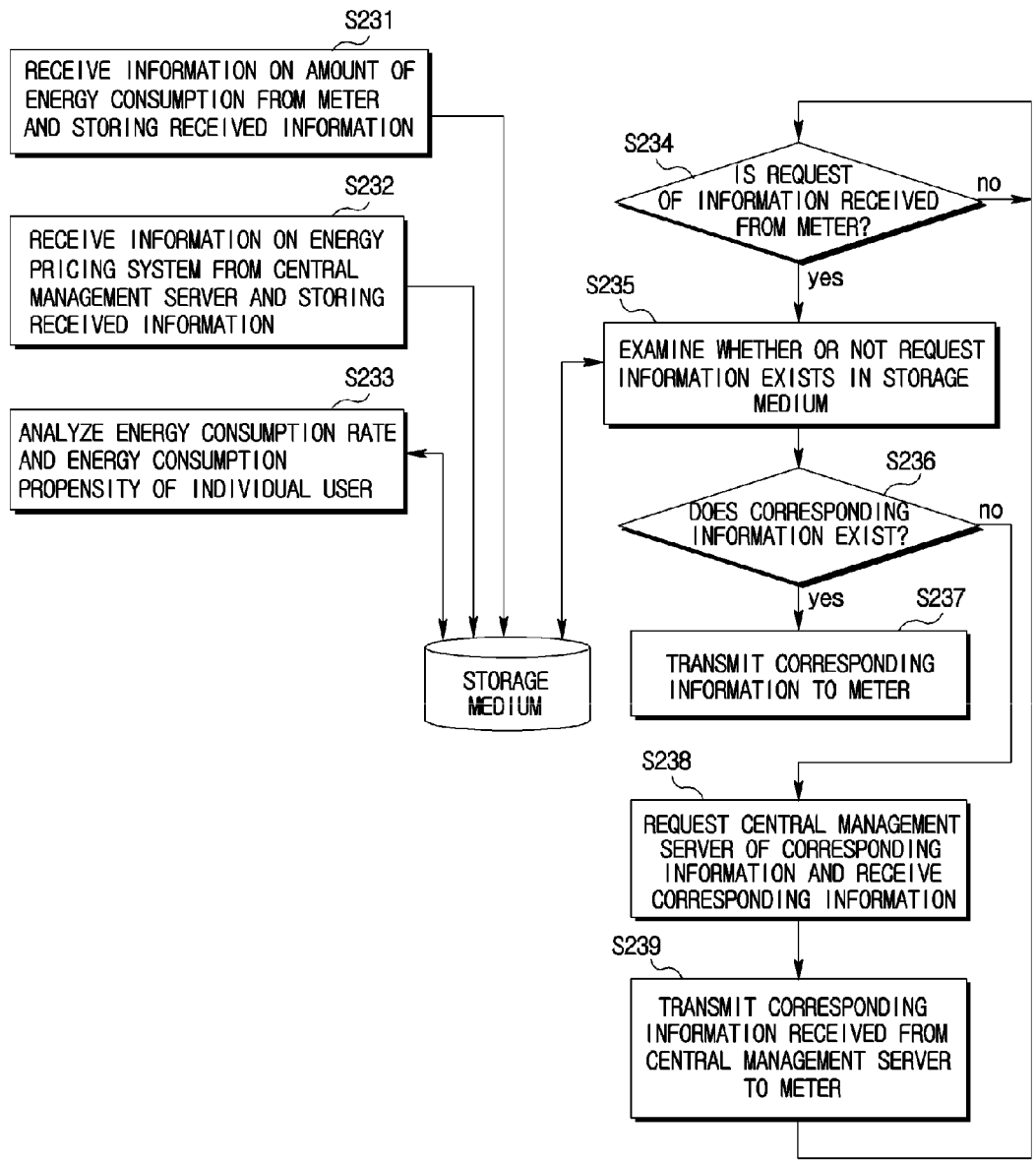

ENERGY MANAGEMENT SYSTEM AND METHOD AND REPEATER FOR ENERGY MANAGEMENT SYSTEM

CROSS-REFERENCE TO RELATED APPLICATION

This application claims the benefit of Korean Patent Application No. 10-2010-0086735, filed Sep. 3, 2010, the disclosure of which is hereby incorporated herein by reference in its entirety.

BACKGROUND OF THE INVENTION

1. Field of the Invention

An aspect of the present invention relates to an energy management system, an energy management method and a repeater for an energy management system, which reduce communication traffic between a central management server and a plurality of meters respectively installed in energy consuming households and enable information on energy consumption rates to be more rapidly provided to users.

2. Description of the Related Art

Recently, various attempts for effectively using limited energy resources have been made.

Accordingly, a plan for differentiating energy price depending on production and consumption situations of energy has recently been conceived, and a smart grid or smart meter has come into the spotlight as a technology for promoting an effective use of energy.

The smart grid is a next-generation power network that can optimize energy efficiency and create a new added value by enabling customers to bidirectionally exchange real-time information with each other through combination of information technology (IT) with a power network.

In view of an energy consumer, the smart grid means that the energy consumer searches a time zone most reasonable for the energy consumer according to a change in energy price and uses energy for the time zone.

The smart meter refers to an electronic meter to which a communication function is added. Since the smart meter can perform bidirectional communication between an energy supplier and a customer, the remote inspection can be performed in real time, and the amount of power consumption can be precisely metered. Accordingly, the smart meter can obtain effects such as saving of metering cost and energy.

Meanwhile, inspection information of meters respectively installed in energy consuming households is transmitted to a central management server through a repeater, and the transmitted inspection information is managed by the central management server. Therefore, a large amount of communication traffic occurs between the central management server and the plurality of meters.

For example, in the case of Korea, meters respectively installed in about ten million households transmits and receives various kinds of energy related information to and from a central management server through a repeater. In addition, the meter installed in each of the energy consuming households may request the central management server of various information related to energy consumption, such as an energy consumption rate, and therefore, communication traffic may be more increased.

The increase in communication traffic may act as a primary factor that interrupts the smooth flow of the energy related information. Further, the increase in communication traffic may make it difficult to rapidly respond to a request of each user by increasing the load of the central management server. Therefore, it is required to develop a plan for solving such a problem.

SUMMARY OF THE INVENTION

Embodiments of the present invention provide an energy management system, an energy management method and a repeater for an energy management system, in which a repeater takes charge of a portion of the function of a central management server, so that it is possible to reduce communication traffic between the central management server and meters and more rapidly respond to requests of users.

According to an aspect of the present invention, there is provided an energy management system, including: a meter configured to inspect an amount of energy consumption and transmit information on the amount of energy consumption to a repeater through a first communication network; a central management server configured to transmit information on an energy pricing system to the repeater through a second communication network, and receive information an energy consumption rate of an individual user from the repeater; and a repeater configured to store the information on the amount of energy consumption, received from the meter, and the information on the energy pricing system, received from the central management server, and calculate the energy consumption rate of the individual user and then transmit the calculated energy consumption rate to the central management sever.

According to an aspect of the present invention, there is provided a repeater for an energy management system, including: a first storage module configured to periodically receive information on an amount of energy consumption from a meter through a first communication network and stores the received information; a second storage module configured to receive information on an energy pricing system from a central management server through a second communication network and store the received information; and a control component configured to analyze an energy consumption rate of an individual user based on the information on the energy pricing system, and transmit information on the analyzed energy consumption rate of the individual user to the meter and the central management server respectively through the first and second communication networks.

According to an aspect of the present invention, there is provided an energy management method, including: receiving information on an amount of energy consumption from a meter through a first communication network and storing the received information; receiving information on an energy pricing system from a central management server through a second communication network and storing the received information; analyzing an energy consumption rate of an individual user; and transmitting information on the analyzed energy consumption rate of the individual user to the central management server through the second communication network.

According to another aspect of the present invention, there is provided an energy management method, including: receiving, by a repeater, receiving information on an amount of energy consumption from a meter through a first communication network and storing the received information in a storage medium; receiving, by the repeater, receiving information on an energy pricing system from a central management server through a second communication network and storing the received information in the storage medium; analyzing, by the repeater, analyzing an energy consumption rate of an individual user and storing the analyzed energy consumption rate in the storage medium; receiving, by the repeater, a request of the information on the energy consumption rate of the individual user from the meter through the first communication network; examining, by the repeater, examining whether or not the requested information on the energy consumption rate of the individual user exists in the storage medium; transmitting, by the repeater, the corresponding information to the meter when the corresponding information exists in the storage medium as the examined result; and receiving, by the repeater, the corresponding information by requesting the central management server of the corresponding information when the corresponding information does not exists in the storage medium as the examined result, and then transmitting the corresponding information to the meter.

The first and second communication networks may be configured as the same network.

The first communication network may be a local area network (LAN), and the second communication network may be a wide area network (WAN).

The first communication network may include at least one of a wireless LAN (WLAN), a power line communication (PLC) network, a Bluetooth network and a Zigbee network.

The second communication network may include at least one of a WLAN network, an Internet network, a code division multiple access (CDMA) network, a personal communication service (PCS) network, a personal handyphone system (PHS) network and a wireless broadband Internet (Wibro) network.

BRIEF DESCRIPTION OF THE DRAWINGS

These and/or other aspects and advantages of the invention will become apparent and more readily appreciated from the following description of the embodiments, taken in conjunction with the accompanying drawings of which:

FIGS. 6 and 7 respectively illustrate embodiments of an energy management method according to the present invention.

DETAILED DESCRIPTION OF THE INVENTION

The present invention is described more fully hereinafter with reference to the accompanying drawings, in which embodiments of the present invention are shown. This present invention may, however, be embodied in many different forms and should not be construed as limited to the embodiments set forth herein. Rather, these embodiments are provided so that this disclosure is thorough, and will fully convey the scope of the present invention to those skilled in the art.

In the present invention, energy may be electricity, gas or water.

Figure 1:
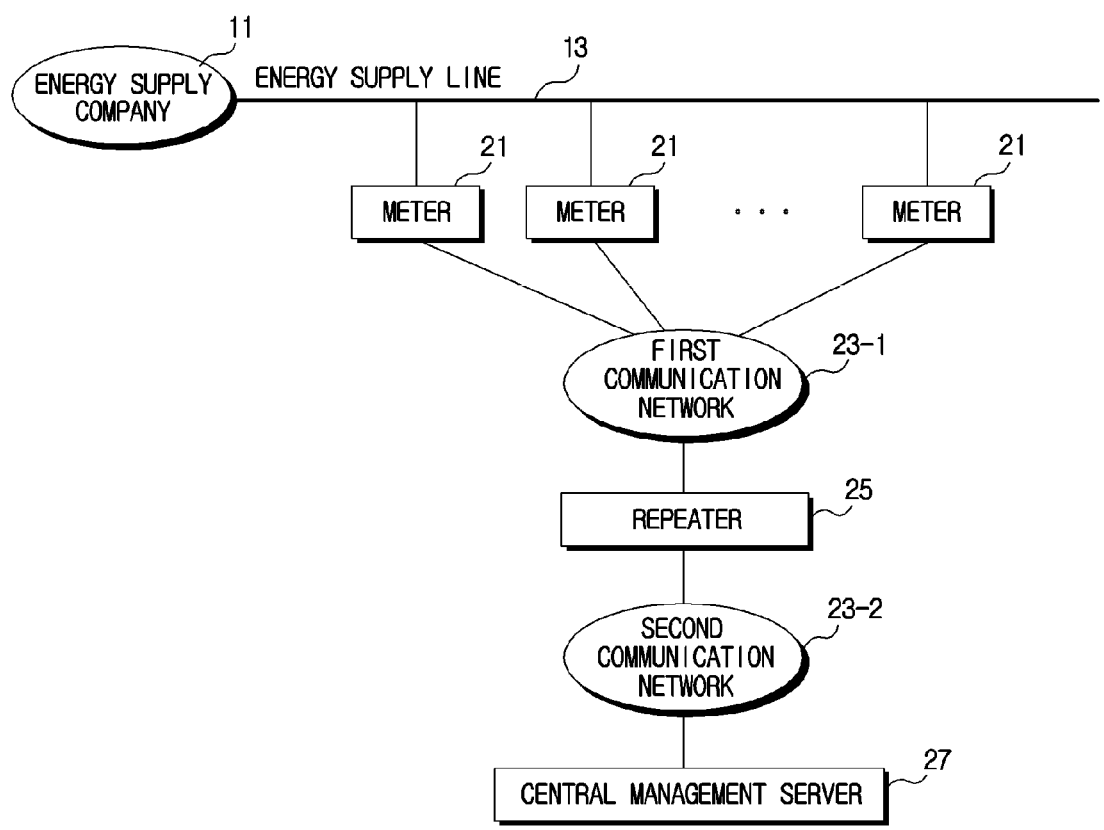
FIG. 1 illustrates an embodiment of an energy management system according to the present invention.
Figure 2:
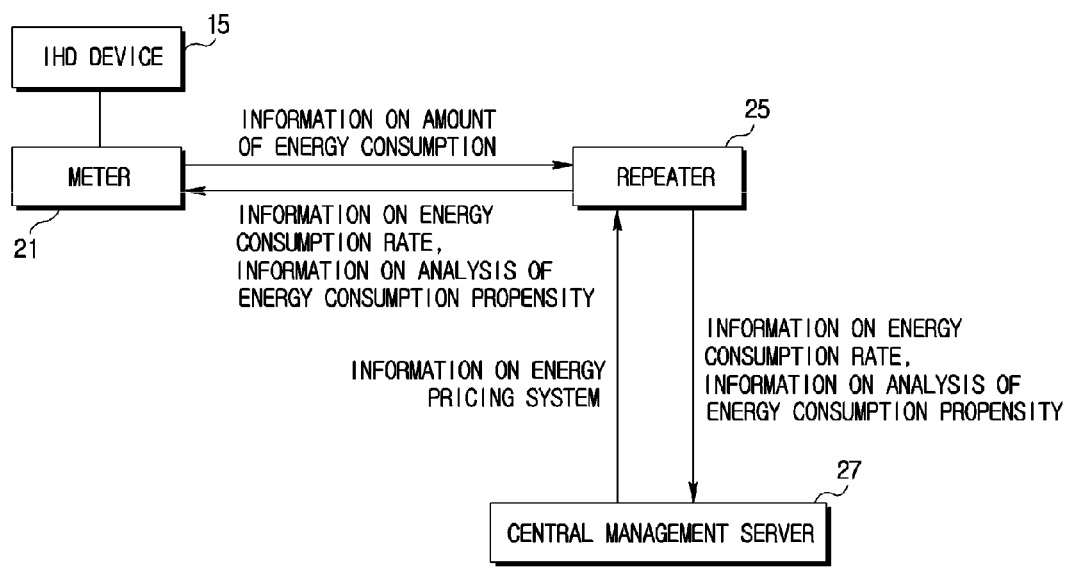
FIG. 2 illustrates an example schematically showing a flow of energy related information according to the present invention.

FIG. 1 illustrates an embodiment of an energy management system according to the present invention. FIG. 2 illustrates an example schematically showing a flow of energy related information. An energy management system according to an embodiment of the present invention will be described with reference to FIGS. 1 and 2.

The energy management system includes meters 21 respectively installed in energy consuming households, a repeater 25 and a central management server 27.

The repeater 25 is installed corresponding to meters respectively installed in energy consuming households in a certain area. Particularly, the repeater 25 may be installed for each shared accommodation such as an apartment building.

An energy supply company 11 supplies energy to each of the energy consuming households through an energy supply line 13. A meter 21 is installed in each of the energy consuming households.

The meter 21 basically meters information on energy consumed in a corresponding energy consuming household, such as an amount of cumulative energy consumption.

The meter 21 has a function of communicating with the repeater 25 through a first communication network 23-1. The meter 21 transmits information on the amount of energy consumption, metered by the meter 21, to the repeater, and receives energy related information from the repeater 25 so as to process the received energy related information.

Information on an energy consumption rate or energy consumption propensity or the like may be used as an example of the energy related information that the meter 21 receives from the repeater 25. The meter 21 may display the energy related information by itself, the energy related information may be transmitted to an in home display (IHD) device to display the transmitted energy related information.

The meter 21 may be configured to having various structures and functions according to the kind and requirement of energy.

The repeater 25 is positioned between the meter 21 and the central management server 27 so as to calculate and keep the energy consumption rate of an individual user.

To this end, the repeater 25 receives information on an amount of energy consumption of an individual user (energy consumption household) from the meter 21 and receiving information on an energy pricing system from the central management server 27, thereby calculating an energy consumption rate of the individual user using the received information.

The information on the energy consumption rate calculated by the repeater 25 is provided to the central management server 25 and the meter 21.

As occasion demands, it may be variously configured when and which information the repeater 25 will transmit to the meter 21 and the central management server 27.

For example, the repeater 25 may immediately transmit the information on the calculated energy consumption rate to the meter 21 or the central management server 27. Alternatively when there is a request of the meter 21 or the central management server 27, the repeater 25 may transmit the information on the calculated energy consumption rate to the meter 21 or the central management server 27.

The repeater 25 may transmit final information to the meter 21 or the central management server 27 regardless of a request of the meter 21 or the central management server 27, and may keep detailed information and then transmit the detailed information when there is a request of the meter 21 or the central management server 27. Here, the final information becomes a basis of the charge of an energy consumption rate such as an energy consumption rate for each month, and the detailed information includes an energy consumption rate for each hour/day or the like.

In addition to the energy consumption rate, the repeater 25 may analyze various information that can be helpful to users and provide the analyzed information to the users.

For example, the repeater 25 may provide various information that enables an individual user to obtain an energy consumption propensity of the individual user, such as an amount of energy consumption for each hour, an energy consumption rate for each hour, an amount of energy consumption for each energy price, a total amount of energy consumption, a total energy consumption rate for each period and information on the comparison of the individual user with other users.

In place of the central management server 27, the repeater 25 performs some of the functions to be performed by the central management server 27, such as the calculation and management of the energy consumption rate of the individual user and the analysis of the energy consumption propensity of the individual user, so that it is possible to reduce the load of the central management server 27 and decrease communication traffic when the central management server 27 and the plurality of meters 21 communicate with each other. Accordingly, the communication in the energy management system can be smoothly performed.

The central management server 27 is a server that performs functions related to services provided by the energy supply company 11.

The central management server 27 may perform various functions as occasion demands. Particularly, in the present invention, the central management server 27 performs a function of providing information on the energy pricing system changed depending on time to the repeater 25, a function of receiving and managing information on the energy consumption rate of an individual user or information on the energy consumption propensity of the individual user from the repeater 25, and the like.

The first communication network 23-1 and a second communication network 23-2 may be variously configured. Here, the meter 21 and the repeater 25 communicate with each other through the first communication network 23-1, and the repeater 25 and the central management server 27 communicate with each other through the second communication network 23-2.

As an example, the first communication network 23-1 may be configured as a local area network (LAN), and the second communication network 23-2 may be a wide area network (WAN).

As another example, the first and second communication networks 23-1 and 23-2 may be configured as the same kind of communication network.

The first communication network 23-1 may include a wireless LAN, a power line communication (PLC) network, a Bluetooth network, a Zigbee network, and the like.

The second communication network 23-2 may include a WLAN network, an Internet network, a code division multiple access (CDMA) network, a personal communication service (PCS) network, a personal handyphone system (PHS) network, a wireless broadband Internet (Wibro) network, and the like.

Figure 3:
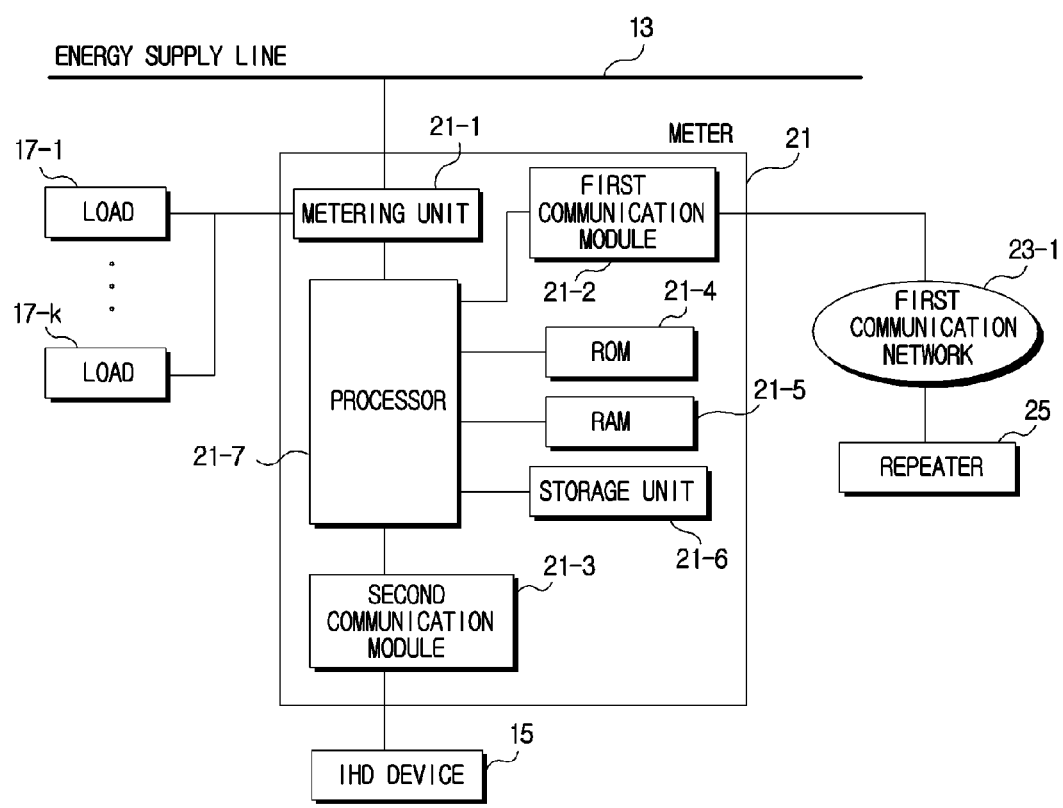
FIG. 3 illustrates an example of a meter.

A specific example of the meter 21 will be described with reference to FIG. 3.

Loads 17-1 to 17-k in an energy consuming household consume energy supplied through the energy supply line 13, and a metering unit 21-1 meters the amount of energy consumed by each of the loads 17-1 to 17-k. As a specific example, the metering unit 21-1 may meter the amount of cumulative energy consumed by each of the loads 17-1 to 17-k.

A first communication module 21-2 may communicate with the repeater 25 through the first communication network 23-1, and a second communication module 21-3 may communicate with an IHD device 15.

The IHD device 15 refers to a device provided to each of the energy consuming households so as to visually display various kinds of energy related information.

The second communication module 21-3 may communicate with the IHD device 15 using various wired/wireless near-field communication methods. The first and second communication modules 21-2 and 21-3 may be integrally configured.

A storage unit 21-6 is a readable and writable, non-volatile storage medium that stores digital data. The storage unit 21-6 stores and maintains various kinds of information related to the operation of the meter 21.

A read only memory (ROM) 21-4 stores a driving program of the meter 21, and a random access memory (RAM) 21-5 temporarily stores data to be immediately accessed by a processor 21-7.

The processor 21-7 generally controls the meter 21 by operating under the driving program stored in the ROM 21-4. The processor 21-7 may be configured using a microprocessor or central processing unit (CPU).

The processor 21-7 stores information on the amount of energy consumption metered by the metering unit 21-1 in the storage unit 21-6, and transmits the stored information to the repeater 25 through the first communication module 21-2.

The processor 21-7 receives the information on the energy consumption rate, the analysis of the energy consumption propensity, or the like from the repeater 25, and transmits the received information to the IHD device 15 through the second communication module 21-3.

Figure 4:
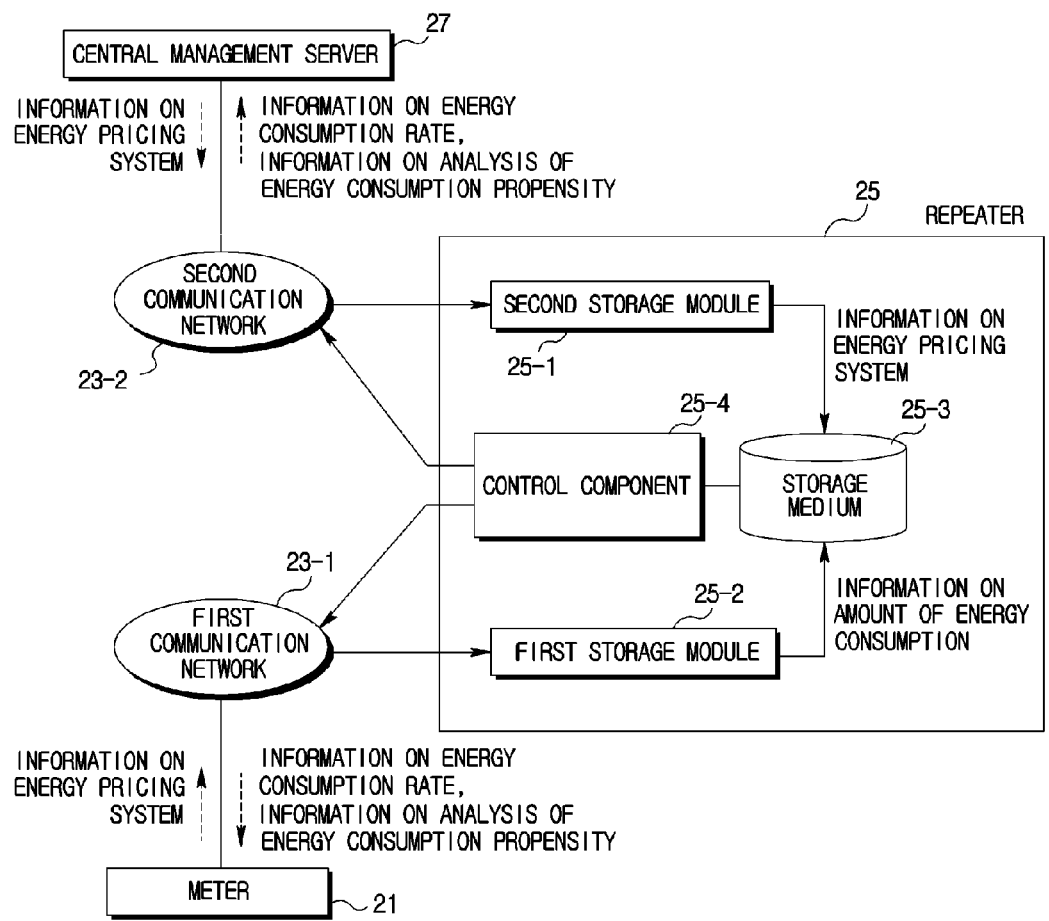
FIG. 4 illustrates an embodiment of a repeater according to the present invention.

An embodiment of the repeater 25 of the energy management system according to the present invention will be described with reference to FIG. 4.

A first storage module 25-2 periodically receives information on an amount of energy consumption of an individual user from the meter 21 through the first communication network 23-1, and stores the received information in the storage medium 25-3.

A second storage module 25-1 receives information on the energy pricing system from the central management server 27 through the second communication network 23-2, and stores the received information in the storage medium 25-3.

A control component 25-4 calculates an energy consumption rate of an individual user based on the information on the energy pricing system, received from the central management server 27, and the information on the amount of energy consumption of the individual user, received from the meter 21, and transmits information on the calculated energy consumption rate of the individual user to the meter 21 and the central management server 27.

The control component 25-4 may analyze an energy consumption propensity of an individual user and provide information on the analyzed energy consumption propensity of the individual user to the meter 21 and the central management server 27.

Here, the information on the energy consumption propensity of the individual user may be variously configured as occasion demands.

For example, the energy consumption propensity of the individual user may include an amount of energy consumption for each hour, an energy consumption rate for each hour, an amount of energy consumption for each energy price, a total amount of energy consumption, a total energy consumption rate for each period and information on the comparison of the individual user with other users.

As occasion demands, it may be variously configured when and which information the control component 25-4 will transmit to the meter 21 and the central management server 27.

For example, the control component 25-4 may immediately transmit the information on the calculated energy consumption rate to the meter 21 or the central management server 27. Alternatively when there is a request of the meter 21 or the central management server 27, the control component 25-4 may transmit the information on the calculated energy consumption rate to the meter 21 or the central management server 27.

The control component 25 may transmit final information to the meter 21 or the central management server 27 regardless of a request of the meter 21 or the central management server 27, and may keep detailed information and then transmit the detailed information when there is a request of the meter 21 or the central management server 27. Here, the final information becomes a basis of the charge of an energy consumption rate such as an energy consumption rate for each month, and the detailed information includes an energy consumption rate for each hour/day or the like.

The method in which the control component 25-4 calculates the energy consumption rate of the individual user using the information on the amount of energy consumption, received from the meter 21, and the information on the energy pricing system, received from the central management server 27, may be variously configured according to the energy pricing system.

Figure 5:
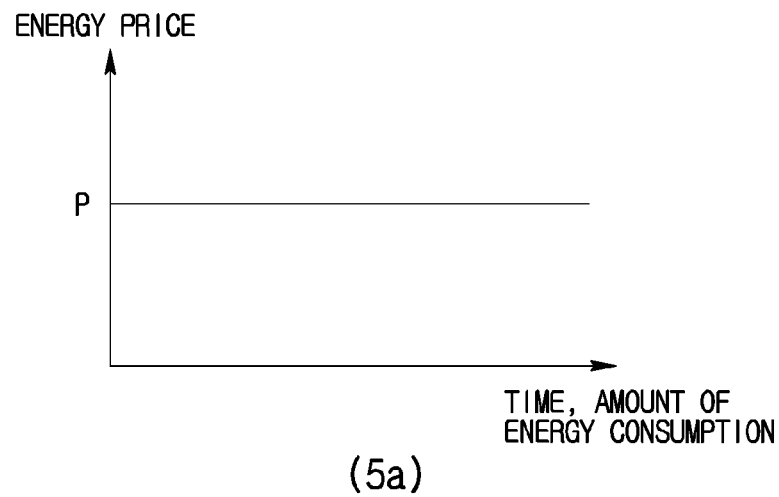
FIG. 5 illustrates various examples related to an energy pricing system.
Figure 5:
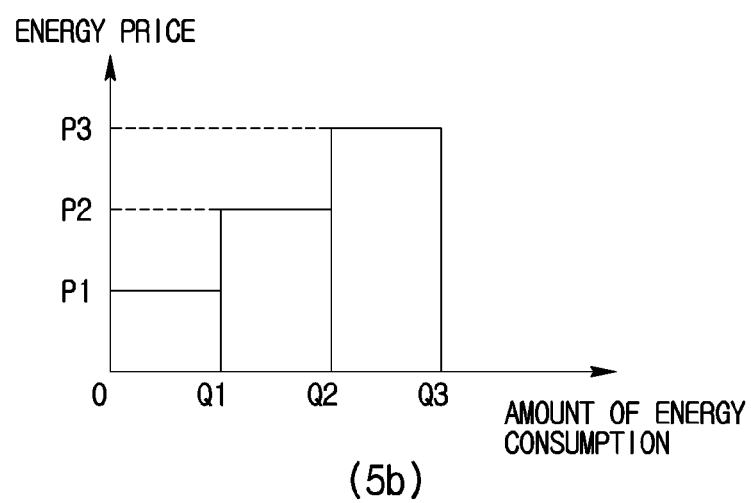
Figure 5:
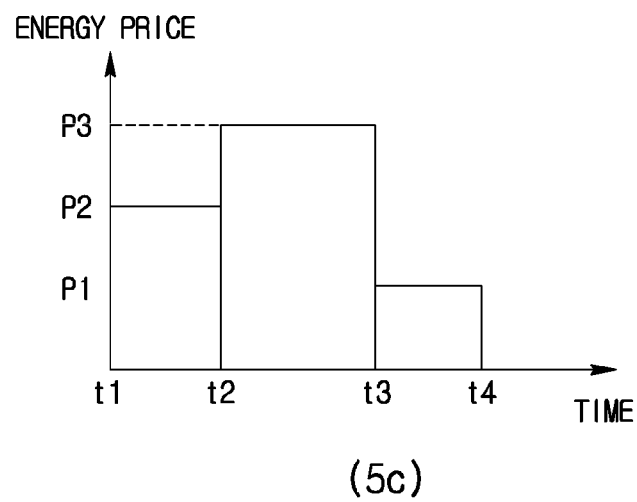

FIG. 5 illustrates various energy pricing systems. FIG. 5a illustrates an example in which the unit energy price is fixed. FIG. 5b illustrates an example of a cumulative system in which the unit energy price is increased according to the amount of energy consumption. FIG. 5c illustrates an example in which the unit energy price is changed depending on time.

In the case of FIG. 5a, the energy consumption rate may be simply calculated by multiplying the unit energy price by the amount of cumulative energy consumption.

For example, if the current amount of cumulative energy consumption of a user is Q1 and the unit energy price is P, the energy consumption rate may be calculated as 'Q1×P'.

In the case of FIG. 5b, the amount of energy consumption for each period is necessarily considered.

For example, if the current amount of cumulative energy consumption of a user is Q3, the energy consumption rate may be calculated as 'Q1×P1+(Q2−Q1)×P2+(Q3−Q2)×P3'.

In the case of FIG. 5c, the energy consumption rate may be calculated by adding all the values obtained by multiplying the amount of energy consumption in each time period by the energy price in the corresponding time period.

For example, it is assumed that the amounts of energy consumption in time periods 't2−t1', 't3−t2' and 't4−t3' are Q1, Q2 and Q3, respectively, and the current time is t4. Then, the energy consumption rate may be calculated as 'Q1×P2+Q2×P3+Q3×P1'.

Meanwhile, the energy management method according to the present invention relates to a method in which a repeater relays energy related information between meters and a central management server.

Figure 6:
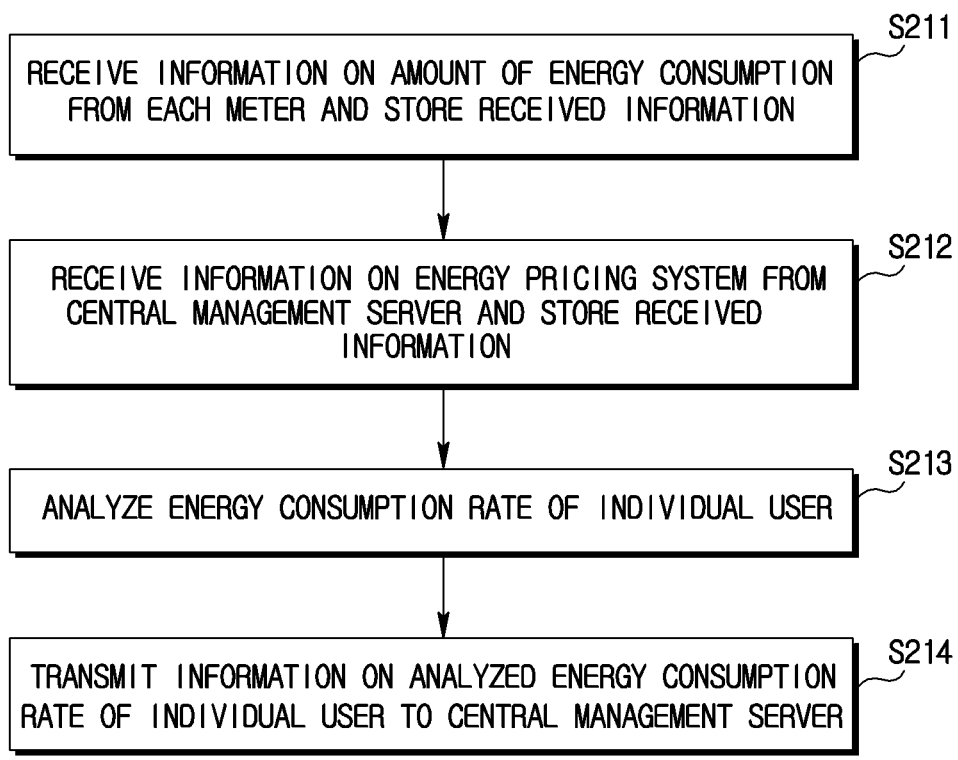

An embodiment of the energy management method according to the present invention will be described with reference to FIG. 6.

First, a repeater receives information on an amount of energy consumption of an individual user (energy consuming household) from a meter through a first communication network and stores the received information (S211).

The repeater receives information on an energy pricing system from a central management through a second communication network and stores the received information (S212).

The repeater calculates an energy consumption rate of the individual user based on the information on the amount of energy consumption of the individual user, received at the step S211, and the information on the energy pricing system, received at the step S212 (S213), and transmits information on the calculated energy consumption rate of the individual user to the central management server (S214).

At the step S214, the repeater may immediately transmit the information on the energy consumption rate of the individual user to the central management server. Alternatively, when there is a request of the central management server, the repeater may transmit the information on the energy consumption rate of the individual user to the central management server.

The repeater may transmit only final information to the central management server, and may transmit the detailed information only when there is a request of the central management server. Here, the final information becomes a basis of the charge of an energy consumption rate such as an energy consumption rate for each month, and the detailed information includes an energy consumption rate for each hour/day or the like.

The information the energy consumption rate calculated at the step S213 may also be transmitted to the meter. The meter may display the received information on the energy consumption rate by itself or may transmit the received information on the energy consumption rate to an IHD device to display the transmitted information.

At the step S213, the repeater may analyze not only the energy consumption rate but also information on the energy consumption propensity of the individual user. The analyzed information on the energy consumption propensity of the individual user may be transmitted to the meter or the central management server.

Another embodiment of the energy management method according to the present invention will be described with reference to FIG. 7.

First, a repeater receives information on an amount of energy consumption of an individual (energy consumption household) from a meter through a first communication network and stores the received information (S231). The repeater receives information on an energy pricing system from a central management system through a second communication network and stores the received information (S232).

The repeater calculates an energy consumption rate of the individual user based on the information on the amount of energy consumption of the individual user, received at the step S231, and the information on the energy pricing system, received at the step S232, and stores the calculated energy consumption rate of the individual user in a storage medium (S233).

At the step S233, the repeater may analyze not only the energy consumption rate but also information on the energy consumption propensity of the individual user. The analyzed information on the energy consumption propensity of the individual user may be stored in the storage medium.

Meanwhile, if the energy consumption rate of the individual user or the analyzed information on the energy consumption propensity of the individual user is requested from the meter (S234), the repeater examines whether or not the corresponding requested information exists by inquiring the storage medium (S235).

If the corresponding information exists in the storage medium as the result examined at the step S235 (S236), the repeater transmits the corresponding information to the meter (S237).

However, if the corresponding information does not exist in the storage medium the result examined at the step S235 (S236), the repeater requires the central management server of the corresponding information and receives the corresponding information (S238). Then, the repeater transmits the corresponding information received from the central management server to the meter (S239).

That is, in a case where the information on the energy consumption rate or energy consumption propensity of the individual user is stored as much as a recent predetermined amount, the repeater receives information that the repeater cannot provide from the central management server and transmits the received information to the meter. Here, the information includes deleted information, information that the repeater does not analyze, and the like.

In each of the embodiments of the energy management method according to the present invention, the first and second communication networks may be variously configured. Here, the meter and the repeater communicate with each other through the first communication network, and the repeater and the central management server communicate with each other through the second communication network.

As an example, the first communication network may be configured as a LAN, and the second communication network may be a WAN.

As another example, the first and second communication networks may be configured as the same kind of communication network.

The first communication network may include a wireless LAN, a PLC network, a Bluetooth network, a Zigbee network, and the like.

The second communication network may include a WLAN network, an Internet network, a CDMA network, a PCS network, a PHS network, a Wibro network, and the like.

According to the present invention, the repeater performs some of the functions to be performed by the central management server, such as the calculation of the energy consumption rate of an individual user and the analysis of the energy consumption propensity of the individual user.

For example, the repeater may calculate and keep detailed information, and transmit only information on an energy consumption rate for each month to the central management server to manage the transmitted information. Here, the detailed information includes an energy consumption rate for each hour/day or the like, and the information on the energy consumption rate for each month becomes a basis of the charge of the energy consumption rate. The repeater may transmit the detailed information only when there is a request of the central management server.

If the repeater shares some of the functions of the central management server, the communication traffic between the central management server and the plurality of meters can be considerably reduced.

Particularly, in the case of a shared accommodation such as an apartment building, a repeater may be installed for each shared accommodation. In this case, it is possible to maximize the effect of reducing communication traffic with the exterior.

Further, when a meter of each energy consuming household requests the repeater of information on the energy consumption rate of an individual user or analysis information on energy consumption, the repeater can respond to the request, thereby performing a more rapid response.

Although the present invention has been described in connection with the preferred embodiments, the embodiments of the present invention are only for illustrative purposes and should not be construed as limiting the scope of the present invention. It will be understood by those skilled in the art that various changes and modifications can be made thereto within the technical spirit and scope defined by the appended claims.

What is claimed is:

1. An energy management system, comprising:
a plurality of meters, each located at a different location that corresponds to one of a plurality of individual users and configured to:
determine an amount of energy consumption at the location at which the corresponding user is located; and
transmit first information to a repeater via a first communication network, the first information related to the determined amount of energy consumption at the location at which the corresponding user is located;
a central management server configured to:
transmit second information to the repeater via a second communication network, the second information related to an energy pricing system; and
receive a calculated energy consumption cost of each of the plurality of individual users from the repeater; and
the repeater located at a location that is remote from the plurality of individual users and configured to:
store the first information received from the meter and the second information received from the central management server in a storage medium;
determine the energy consumption cost of each of the plurality of individual users;
store the determined energy consumption cost of each of the plurality of individual users in the storage medium;
transmit the determined energy consumption cost of each of the plurality of individual users to the central management server,
determine whether information related to the energy consumption cost is stored in the storage medium when there is a request from one of the plurality of meters for the information related to the energy consumption cost;
transmit the requested information to the corresponding meter if it is determined that the information related to the energy consumption cost is stored in the storage medium; and
request the information related to the energy consumption cost from the central management server, receive the requested information from the central management server and transmit the received information to the corresponding meter if it is determined that the information related to the energy consumption cost is not stored in the storage medium.

2. The energy management system of claim 1, wherein the first and second communication networks use a same type of network.

3. The energy management system of claim 1, wherein:
the first communication network is a local area network (LAN); and
the second communication network is a wide area network (WAN).

4. The energy management system of claim 1, wherein the first communication network comprises at least a wireless local area network (WLAN), a power line communication (PLC) network, a Bluetooth™ network or a Zigbee™ network.

5. The energy management system of claim 1, wherein the second communication network comprises at least a wireless local area network (WLAN), an Internet network, a code division multiple access (CDMA) network, a personal communication service (PCS) network, a personal handyphone system (PHS) network or a wireless broadband Internet (Wibro) network.

6. A repeater for an energy management system, the repeater comprising:
a first storage module configured to:
periodically receive first information from a meter via a first communication network, the first information related to an amount of energy consumption; and
store the received first information in a storage medium;
a second storage module configured to:
receive second information from a central management server via a second communication network, the second information related to an energy pricing system; and
store the received second information in the storage medium; and
a control component configured to:
determine an energy consumption cost of an individual user based on the second information;
store the determined energy consumption cost in the storage medium; and
transmit information related to the determined energy consumption cost to the meter via the first communication network and to the central management server via the second communication network;
determine whether information related to the energy consumption cost is stored in the storage medium when there is a request from the meter for the information related to the energy consumption cost;
transmit the requested information to the meter if it is determined that the requested information related to the energy consumption cost is stored in the storage medium; and
request the information related to the energy consumption cost from the central management server, receive the requested information from the central management server and transmit the received information to the meter if it is determined that the information related to the energy consumption cost is not stored in the storage medium,
wherein the repeater is located at a location that is remote from the individual user.

7. The repeater of claim 6, wherein the first and second communication networks use a same type of network.

8. The repeater of claim 6, wherein:
the first communication network is a local area network (LAN); and
the second communication network is a wide area network (WAN).

9. The repeater of claim 6, wherein the first communication network comprises at least a wireless local area network (WLAN), a power line communication (PLC) network, a Bluetooth™ network or a Zigbee™ network.

10. The repeater of claim 6, wherein the second communication network comprises at least a wireless local area network (WLAN), an Internet network, a code division multiple access (CDMA) network, a personal communication service (PCS) network, a personal handyphone system (PHS) network or a wireless broadband Internet (Wibro) network.

11. An energy management method, comprising:
receiving, by a repeater located at a location that is remote from a plurality of individual users, first information from a plurality of meters each located at a different location that corresponds to one of the plurality of individual users, the first information received via a first communication network and related to an amount of energy consumption;
storing the received first information in a storage medium;
receiving, by the repeater, second information from a central management server via a second communication network, the second information related to an energy pricing system;
storing the received second information in the storage medium;
determining, by the repeater, an energy consumption cost of each of the plurality of individual users based on the first and second information;
storing the determined energy consumption cost of each of the plurality of individual users in the storage medium;
receiving, by the repeater, a request from one of the plurality of meters via the first communication network, the request for information related to the energy consumption cost of the corresponding one of the plurality of individual users;
determining, by the repeater, whether the requested information is stored in the storage medium;
transmitting, by the repeater, the requested information to the corresponding meter if it is determined that the requested information is stored in the storage medium; and
requesting, by the repeater, the information related to the energy consumption cost from the central management server, receiving the requested information from the central management server and transmitting the received information to the corresponding meter if it is determined that the requested information is not stored in the storage medium.

12. The energy management method of claim 11, wherein the first and second communication networks use a same type of network.

13. The energy management method of claim 11, wherein:
the first communication network is a local area network (LAN); and
the second communication network is a wide area network (WAN).

14. The energy management method of claim 11, wherein:
the first communication network comprises at least a wireless local area network (WLAN), a PLC network, a Bluetooth™ network or a Zigbee™ network.

15. The energy management method of claim 11, wherein the second communication network comprises at least a wireless local area network (WLAN), an Internet network, a CDMA network, a PCS network, a PHS network or a wireless broadband Internet (WIBRO) network.

* * * * *